(12) United States Patent
Beeson

(10) Patent No.: US 8,110,027 B2
(45) Date of Patent: Feb. 7, 2012

(54) HEATED BLANKET FOR AIR SEPARATION MODULE

(75) Inventor: William Joseph Beeson, West Hartford, CT (US)

(73) Assignee: Hamilton Sundstrand Corporation, Windsor Locks, CT (US)

( * ) Notice: Subject to any disclaimer, the term of this patent is extended or adjusted under 35 U.S.C. 154(b) by 369 days.

(21) Appl. No.: 12/425,578

(22) Filed: Apr. 17, 2009

(65) Prior Publication Data
US 2010/0263537 A1 Oct. 21, 2010

(51) Int. Cl.
*B01D 53/22* (2006.01)

(52) U.S. Cl. .............. 96/4; 96/8; 96/9; 96/10; 96/11; 96/420; 95/18; 95/45; 95/47; 95/54; 219/201

(58) Field of Classification Search ............ 96/4, 7, 96/8, 9, 10, 11, 420; 95/14, 18, 45, 47, 54; 219/200, 201, 212
See application file for complete search history.

(56) References Cited

U.S. PATENT DOCUMENTS

| | | | |
|---|---|---|---|
| 4,225,542 A * | 9/1980 | Wall et al. ............... 261/142 |
| 4,787,919 A * | 11/1988 | Campbell et al. ............ 95/54 |
| 4,822,659 A * | 4/1989 | Anderson et al. ............ 428/99 |
| 4,944,776 A * | 7/1990 | Keyser et al. ............... 95/52 |
| 5,302,189 A * | 4/1994 | Barbe et al. ................ 95/54 |
| 5,429,662 A * | 7/1995 | Fillet ..................... 95/54 |
| 5,688,306 A * | 11/1997 | Verini .................... 95/54 |
| 6,491,739 B1 | 12/2002 | Crome et al. |
| 6,554,261 B2 * | 4/2003 | Katagiri et al. .............. 96/8 |
| 6,729,359 B2 | 5/2004 | Jones |
| 6,739,359 B2 | 5/2004 | Jones et al. |
| 6,913,636 B2 | 7/2005 | Defrancesco et al. |
| 6,997,970 B2 | 2/2006 | Crome |
| 7,081,153 B2 | 7/2006 | Leigh |
| 7,152,635 B2 | 12/2006 | Moravec et al. |
| 7,159,620 B2 * | 1/2007 | Kissell ................... 138/149 |
| 7,175,692 B2 | 2/2007 | Schwalm |
| 7,273,507 B2 | 9/2007 | Schwalm |
| 7,300,494 B2 | 11/2007 | Schwalm et al. |
| 7,306,646 B2 | 12/2007 | Wong |
| 7,445,659 B2 | 11/2008 | Schwalm |
| 7,833,314 B2 * | 11/2010 | Lane et al. ................. 95/54 |
| 7,892,321 B2 * | 2/2011 | Aagesen et al. ............. 95/54 |
| 2001/0000380 A1 * | 4/2001 | Buxbaum ................. 95/45 |
| 2007/0137478 A1 * | 6/2007 | Stein et al. ................ 95/54 |

FOREIGN PATENT DOCUMENTS

| JP | 63258620 | 10/1988 |
|---|---|---|
| JP | 2102710 | 4/1990 |
| JP | 7185253 | 7/1995 |
| JP | 2003291894 | 10/2003 |

* cited by examiner

*Primary Examiner* — Jason M Greene
(74) *Attorney, Agent, or Firm* — Carlson, Gaskey & Olds, PC

(57) ABSTRACT

An air separation module and blanket has an air separation module having an air inlet, an oxygen outlet and a nitrogen outlet. At least one tank has air separation elements for separating oxygen from air, and delivers the separated oxygen to the oxygen outlet, and delivers nitrogen to the nitrogen outlet. A resistance heating element is positioned between the blanket and the air separation module. Further, an inventive blanket for use with the air separation module is also disclosed and claimed.

18 Claims, 3 Drawing Sheets

HEATED BLANKET FOR AIR SEPARATION MODULE

BACKGROUND OF THE INVENTION

This application relates to a heated blanket to be incorporated in an air separation module.

Air separation modules are utilized, and in particular, in aircraft environments. In an air separation module, air is passed into a separation tank. In one type of separation tank, tube sheets are spaced from each other, and connected by hollow fibers. The hollow fibers are constructed such that oxygen can permeate the fiber and move into a chamber surrounding the fiber. Nitrogen passes through the fiber to a downstream chamber. The nitrogen may be utilized to create an inert environment in a fuel tank, resisting flame. The oxygen may be utilized such as for passenger or pilot air supply.

In this known type of air separation module, heat makes the process occur more efficiently. Presently, to provide additional heat, an air compressor supplying the air is run at higher speeds such that the air is hotter when it reaches the air separation module. However, running the compressor at higher speeds decreases efficiency of the overall system. Increasing the speed of the compressor to increase the heat is not a cost-effective way to provide additional heat.

Other methods of increasing heat have been proposed. In general, they require an additional component, such as a valve, etc.

SUMMARY OF THE INVENTION

An air separation module and blanket has an air separation module having an air inlet, an oxygen outlet and a nitrogen outlet. At least one tank has air separation elements for separating oxygen from air, and delivers the separated oxygen to the oxygen outlet, and delivers nitrogen to the nitrogen outlet. A resistance heating element is positioned between the blanket and the air separation module. Further, an inventive blanket for use with the air separation module is also disclosed and claimed.

These and other features of the present invention can be best understood from the following specification and drawings, the following of which is a brief description.

DETAILED DESCRIPTION OF THE PREFERRED EMBODIMENT

Figure 1:
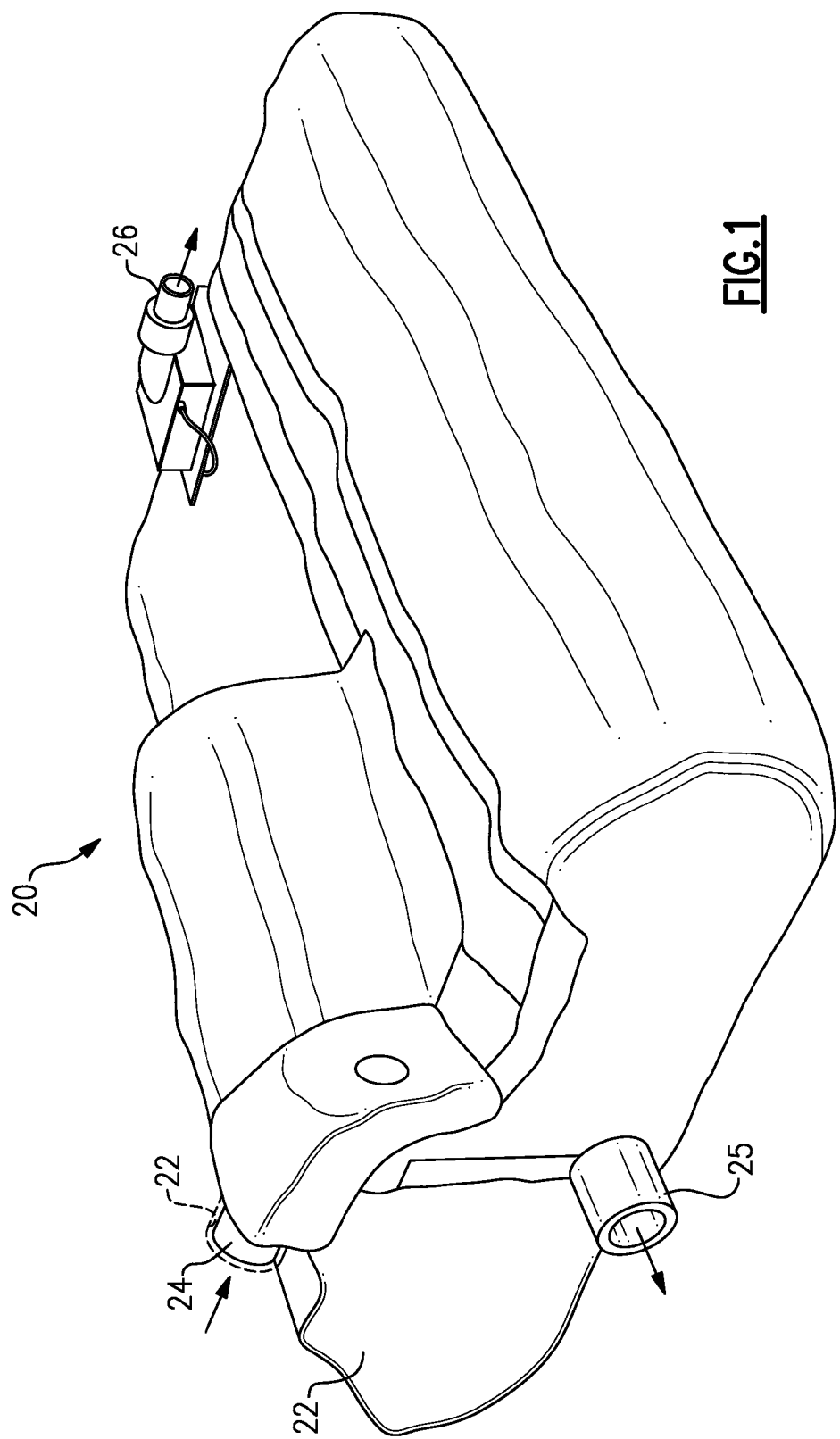
FIG. 1 is a view of an air separation module and its surrounding blanket.

FIG. 1 shows an air separation module 20 having a blanket 22 surrounding the module. A compressor supplies air to an air input port 24, which is shown extending into the blanket, and an oxygen outlet tube 25 connects to a use of oxygen, such as the pilot air supply, or a passenger cabin air supply, or may simply be a dump to atmosphere. An outlet 26 of nitrogen is connected to a use of nitrogen, such as an aircraft fuel tank. As is clear, the blanket surrounds components of the air separation module, but does not surround the compressor.

The blanket 22 is known, and is utilized to retain heat within the module 20. The air separation process occurs most efficiently when a higher temperature is maintained within the module tanks, as will be described below. The insulation blanket as known may be rubber on the outside, with some insulating polymer on an inner surface. Still, as mentioned above, additional heat is typically required to make the separation process occur most efficiently. As also shown in phantom, the blanket 22 can extend over a portion of the input port 24. Further, the term "blanket" as utilized in this application could extend to a separate blanket portion which covers the inlet portion 24 or other portions. As can be appreciated, air enters the space within the blanket 22 through the air inlet 24.

Figure 2:
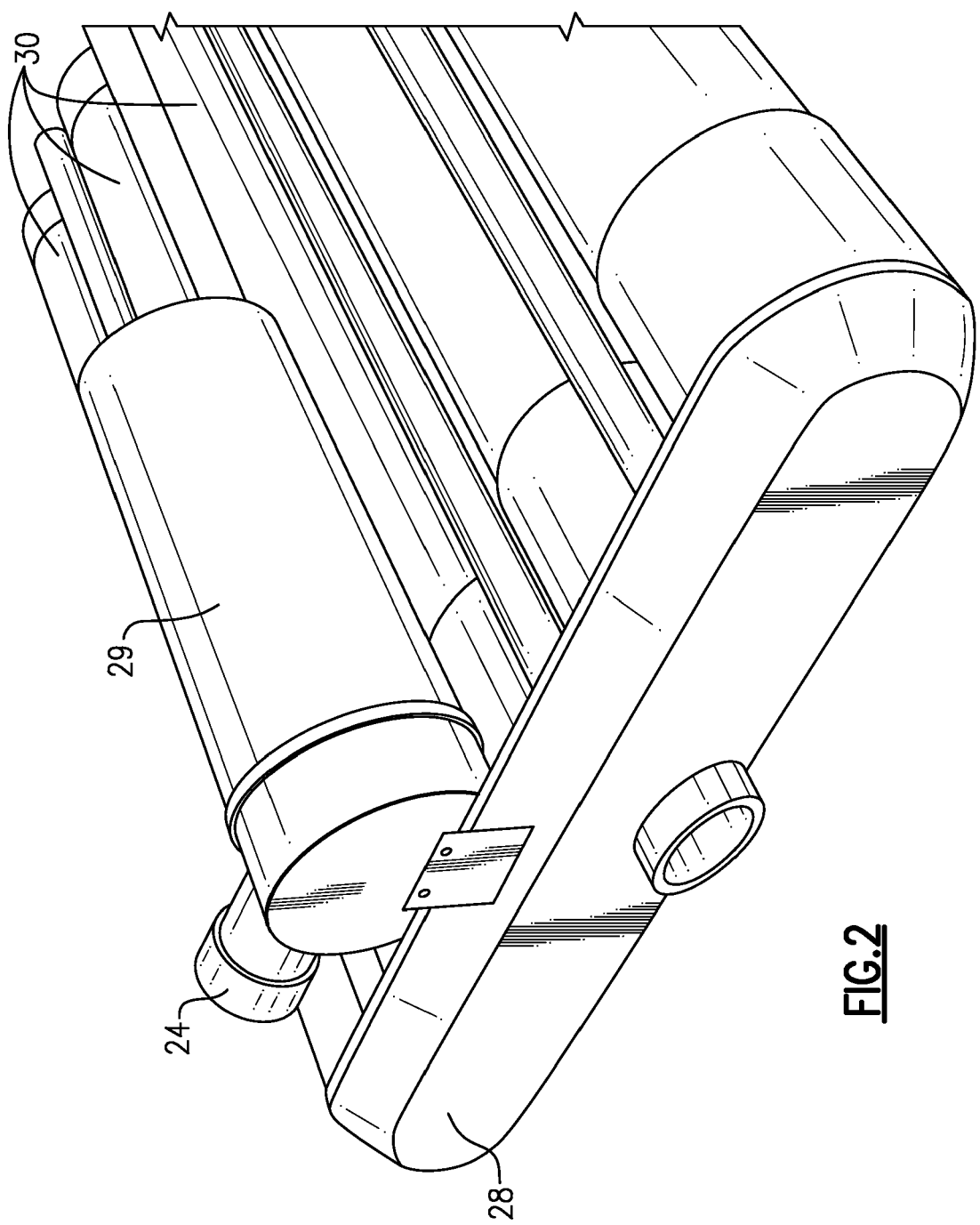
FIG. 2 is a perspective view of the air separation module without the blanket.

As shown in FIG. 2, the detail of the air separation tanks 30 is shown. An air filter 29 is connected downstream of the inlet 24, and communicates air into an inlet manifold 28, which then delivers the air into the tanks 30.

Figure 3A:
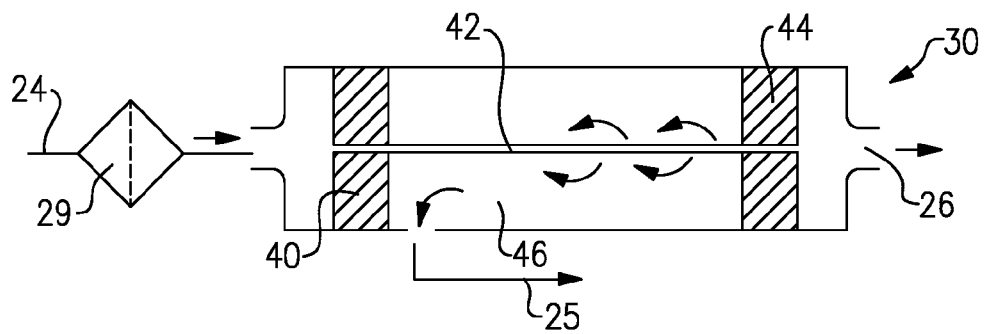
FIG. 3A is a cross-sectional view of a tank for an air separation module.
Figure 3B:
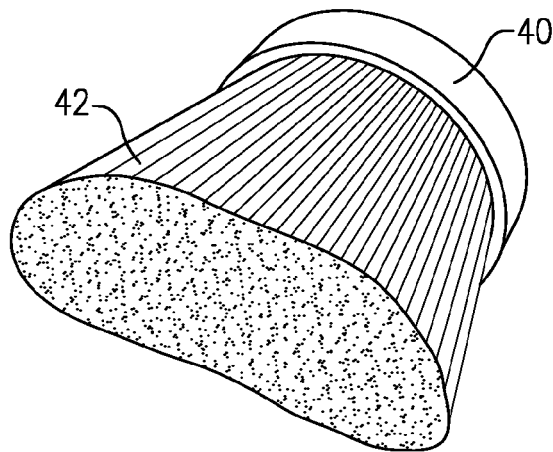
FIG. 3B shows a portion of the fiber and tube sheets as utilized in the air separation modules.

As shown in FIG. 3A, the tanks 30 may include tube sheets 40 and 44 with intermediate extending fibers 42. Although one fiber is shown in FIG. 3A, as can be appreciated from FIG. 3B, in fact, there are hundreds of fibers 42 extending between the tube sheets 40 and 44. This structure is as known in the art, and may be an air separation module as is supplied by Carleton Life Support Systems, Inc. Of course, this application extends to other air separation module types.

Oxygen permeates outwardly through the hollow fibers 42, and will be received in a chamber 46 surrounding the fibers. That oxygen is then delivered to the oxygen outlet line 25. Nitrogen will pass through the fibers, and will not permeate the fibers, instead being delivered to the nitrogen outlet 26.

Figure 4:
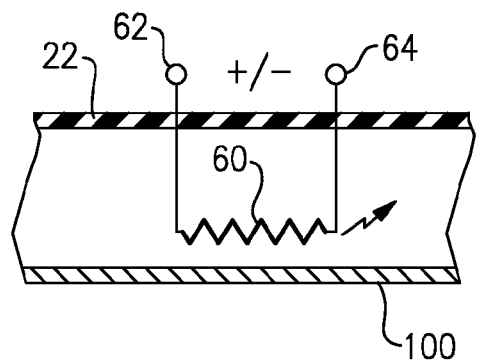
FIG. 4 is a cross-sectional view through a surrounding blanket.

FIG. 4 shows an inventive aspect of this application. The blanket 22 is provided with a resistance heater element 60 positioned along at least a portion of the module 20. In FIG. 4, the resistance heater element 60 is shown associated with a component or element 100. The element 100 may be a portion of the tanks 30, the air filter 29, the manifold 28, or the inlet port 24. Each of these are possible locations for the application of the additional heat. In some ways, the more upstream the location where heat is applied, the greater potential efficiency increase. Thus, as is clear, many locations for the resistant heating element 60 are positioned to be upstream of the tanks 30. Of course, more than one location can receive the heat.

Terminals 62 and 64 are connected to a voltage, and a resultant resistance within the resistance heating element 60 will then increase the temperature adjacent to the element 100, and thus improve the efficiency of the process. Further, the resistance element may only extend along a portion of the tanks 30, or may extend along the entire length of the tanks 30. The greater the length of the area along which heat is added, the greater the increased efficiency that will be achieved will also be.

In general, the resistance element can be positioned at any location between an inner wall of the blanket 22, and an outer surface of the air separation module itself.

Although an embodiment of this invention has been disclosed, a worker of ordinary skill in this art would recognize that certain modifications would come within the scope of this invention. For that reason, the following claims should be studied to determine the true scope and content of this invention.

What is claimed is:

1. An air separation module and blanket comprising:
an air separation module having an air inlet, an oxygen outlet and a nitrogen outlet;

at least one tank having air separation elements for separating oxygen from air, and delivering the separated oxygen to the oxygen outlet, and delivering a remaining nitrogen to the nitrogen outlet;

an insulating blanket surrounding the at least one tank, and the air inlet for bringing air into a space within said blanket; and a resistance heating element positioned between said blanket and said air separation module.

2. The air separation module and blanket as set forth in claim 1, wherein said resistance heating element is positioned along said at least one air separation tank.

3. The air separation module and blanket as set forth in claim 2, wherein said at least one tank includes a pair of spaced tube sheets, being connected by a plurality of hollow fibers, with said hollow fibers being designed to allow oxygen to permeate through said hollow fiber, and then be delivered to said oxygen outlet.

4. The air separation module as set forth in claim 1, wherein said blanket surrounds a plurality of said tanks.

5. The air separation module as set forth in claim 4, wherein said blanket also surrounds an inlet manifold and air filter.

6. The air separation module as set forth in claim 1, wherein said blanket has a rubber layer.

7. A blanket for use with an air separation module comprising:

a blanket member having an inner surface for surrounding the air separation module and insulating the air separation module, and said blanket being formed of an insulating material, and said blanket also having a shape to surround an air filter downstream of an inlet when the blanket member is positioned on an air separation module; and a resistance heating element being positioned inward of said blanket such that said resistance heating element can deliver heat to an air separation module that is received within said blanket.

8. The blanket as set forth in claim 7, wherein said resistance element is positioned within said blanket such that it will be positioned outwardly of an air separation module tank, which is a portion of the air separation module to be received within the blanket.

9. The blanket as set forth in claim 7, wherein said blanket surrounds a plurality of said tanks.

10. The blanket as set forth in claim 9, wherein said blanket also surrounds an inlet manifold.

11. The blanket as set forth in claim 7, wherein said blanket has a rubber layer.

12. The air separation module and blanket as set forth in claim 1, wherein the air inlet receiving air from a compressor, and said compressor being positioned outwardly of said insulating blanket.

13. The air separation module and blanket as set forth in claim 1, wherein said resistant heating element being positioned to be upstream of said at least one tank.

14. The air separation module and blanket as set forth in claim 13, wherein said resistant heating element being entirely positioned upstream of said at least one tank.

15. The air separation module and blanket as set forth in claim 13, wherein said resistance heating element is positioned along said air inlet.

16. The air separation module and blanket as set forth in claim 13, wherein said resistance heating element is positioned along an air filter which is downstream of said air inlet.

17. The air separation module and blanket as set forth in claim 13, wherein said resistance heating element is positioned along an inlet manifold which is downstream of said air inlet.

18. The blanket as set forth in claim 7, wherein said resistant heating element being positioned on said blanket at a location which will be upstream of a tank having air separation elements when the blanket is positioned on the air separation module.

* * * * *